(12) United States Patent
Dyer et al.

(10) Patent No.: US 8,464,280 B2
(45) Date of Patent: Jun. 11, 2013

(54) EXECUTION CONTEXT CONTROL

(75) Inventors: John Dyer, Monroe, WA (US); Henricus Johannes Maria Meijer, Mercer Island, WA (US); Mark Shields, Seattle, WA (US); Jeffrey van Gogh, Redmond, WA (US); Danny van Velzen, Redmond, WA (US); Brian Beckman, Newcastle, WA (US); Harish Kantamneni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 12/684,133

(22) Filed: Jan. 8, 2010

(65) Prior Publication Data

US 2011/0173620 A1     Jul. 14, 2011

(51) Int. Cl.
*G06F 9/54* (2006.01)

(52) U.S. Cl.
USPC .......................................................... 719/318

(58) Field of Classification Search
CPC ........................... H04L 29/08693; G06F 9/542
USPC ................... 719/318; 718/108, 102; 709/231
See application file for complete search history.

(56) References Cited

U.S. PATENT DOCUMENTS

| | | | |
|---|---|---|---|
| 6,289,369 B1 | 9/2001 | Sundaresan | |
| 6,988,268 B2 | 1/2006 | Zuberi | |
| 7,065,493 B1 | 6/2006 | Homsi | |
| 7,487,511 B2 | 2/2009 | Stall | |
| 2003/0101190 A1* | 5/2003 | Horvitz et al. | 707/100 |
| 2003/0187743 A1 | 10/2003 | Kumaran et al. | |
| 2003/0217053 A1 | 11/2003 | Bachman et al. | |
| 2004/0078373 A1 | 4/2004 | Ghoneimy et al. | |
| 2005/0183071 A1* | 8/2005 | Meijer et al. | 717/140 |
| 2006/0080616 A1 | 4/2006 | Vogel et al. | |
| 2009/0199159 A1 | 8/2009 | Meijer et al. | |
| 2009/0204666 A1* | 8/2009 | Sana et al. | 709/203 |
| 2009/0276778 A1 | 11/2009 | Ringseth et al. | |
| 2009/0276791 A1* | 11/2009 | Meijer | 719/318 |
| 2010/0131556 A1* | 5/2010 | Meijer et al. | 707/771 |
| 2011/0138403 A1* | 6/2011 | Meijer et al. | 719/328 |

OTHER PUBLICATIONS

Bishop, J., "C# 3.0 Design Patterns" (Dec. 2007), O'Reilly Media, Inc., pp. 210-219.*
Syme, D.; Granicz, A.; Cisternino, A., "Expert F#" (2007), Apress, pp. 207-210.*
Syme, et al., "Expert F#", Retrieved at <<http://download.microsoft.com/download/b/b/6/bb666ebe-e643-496f-b290-03527d157b47/Expert.F.Sharp_Ch13_8504Syme.pdf>> 2007, pp. 353-392.
"Thread affinity of user interface objects, part 1: Window handles", Retrieved at <<http://blogs.msdn.com/oldnewthing/archive/2005/10/10/479124.aspx>> Oct. 10, 2005, pp. 3.

* cited by examiner

*Primary Examiner* — H S Sough
*Assistant Examiner* — Brian Wathen

(57) ABSTRACT

A system and method for controlling the execution of notifications in a computer system with multiple notification contexts. A RunOn operator enables context hopping between notification contexts. Push-based stream operators optionally perform error checking to determine if notifications combined into a push-based stream share a common notification context. Context boxes group together notification creators and associate their notifications with a common scheduler and notification context. Operators employ a composition architecture, in which they receive one or more push-based streams and produce a transformed push-based stream that may be further operated upon. Components may be used in combinations to implement various policies, including a strict policy in which all notifications are scheduled in a common execution context, a permissive policy that provides programming flexibility, and a hybrid policy that combines flexibility with error checking.

20 Claims, 13 Drawing Sheets

EXECUTION CONTEXT CONTROL

BACKGROUND

Many computer programs use multiple execution contexts to perform work asynchronously and concurrently. Execution contexts include computers, processors, threads, or the like. One example of this is the use of multiple threads to perform work asynchronously. Typically, a thread or other execution context may maintain data such as an observable state or other local data that is not directly accessible to other threads or execution contexts. Problems may arise in a situation where an execution context performs actions that may use unavailable data. For example, one execution context may maintain settings for a user's locale or other preferences. Another execution context may perform actions without access to this data, causing the wrong locale or other preferences to be used. In another example, a program may have a user interface (UI) thread that processes UI notifications and updates the user interface, and one or more other threads that process other types of notifications or perform various operations. Problems may arise when instructions on one of the other threads attempts to update the user interface. This may cause conflicts and result in an exception and a program crash.

An example of this is a dictionary suggest application that looks up suggested corrections based on a word the user has typed. The UI thread may send a request for suggestions to a local or remote server. A handler executing on a secondary thread may receive the server's response and attempt to update the UI. This can cause an execution exception.

As a consequence of situations such as described above, it is desirable for program developers to have control over the execution context in which their program code executes. Various programming environments include a mechanism for moving a computation from one thread to another. These mechanisms may add a level of complexity or restrictions that are undesirable to a programmer, or have other limitations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate handling of notifications in a computer program executing in a system having multiple execution contexts. Mechanisms may include components to transfer a notification or stream of notifications from one execution context to another. One such mechanism receives a push-based stream with notifications that originate in a first execution context and a request that the notifications be handled in a second execution context. In response to receiving the request, the push-based stream may be associated with the second execution context, producing a second push-based stream that represents this association. The second push-based stream may be returned to a calling program. In response to an occurrence of a notification in the second push-based stream, mechanisms may cause the notification to be processed in the second execution context.

In one embodiment, a source language interface is provided to enable instructions that specify the request to process the notifications, receive the returned second push-based stream, and perform additional processing of the second push-based stream.

In one embodiment, a mechanism associates one or more notification creation components with a specified execution context. In response to an occurrence of a notification produced by one of the notification creation components, a scheduler schedules the notification in the specified execution context. One or more execution context boxes may be created, each one having a corresponding specified execution context.

In one embodiment, an error checker may, in response to a request to combine a first notification with a second notification into a combined push-based stream, determine whether the execution context associated with the first notification is equivalent to an execution context associated with the second notification. If they are not equivalent, the error checker may provide an error notification.

In various embodiments, an execution context may be a UI thread, a synchronized event loop, a system pool of threads, a newly created thread, a trampoline of actions, a process, or a processor.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
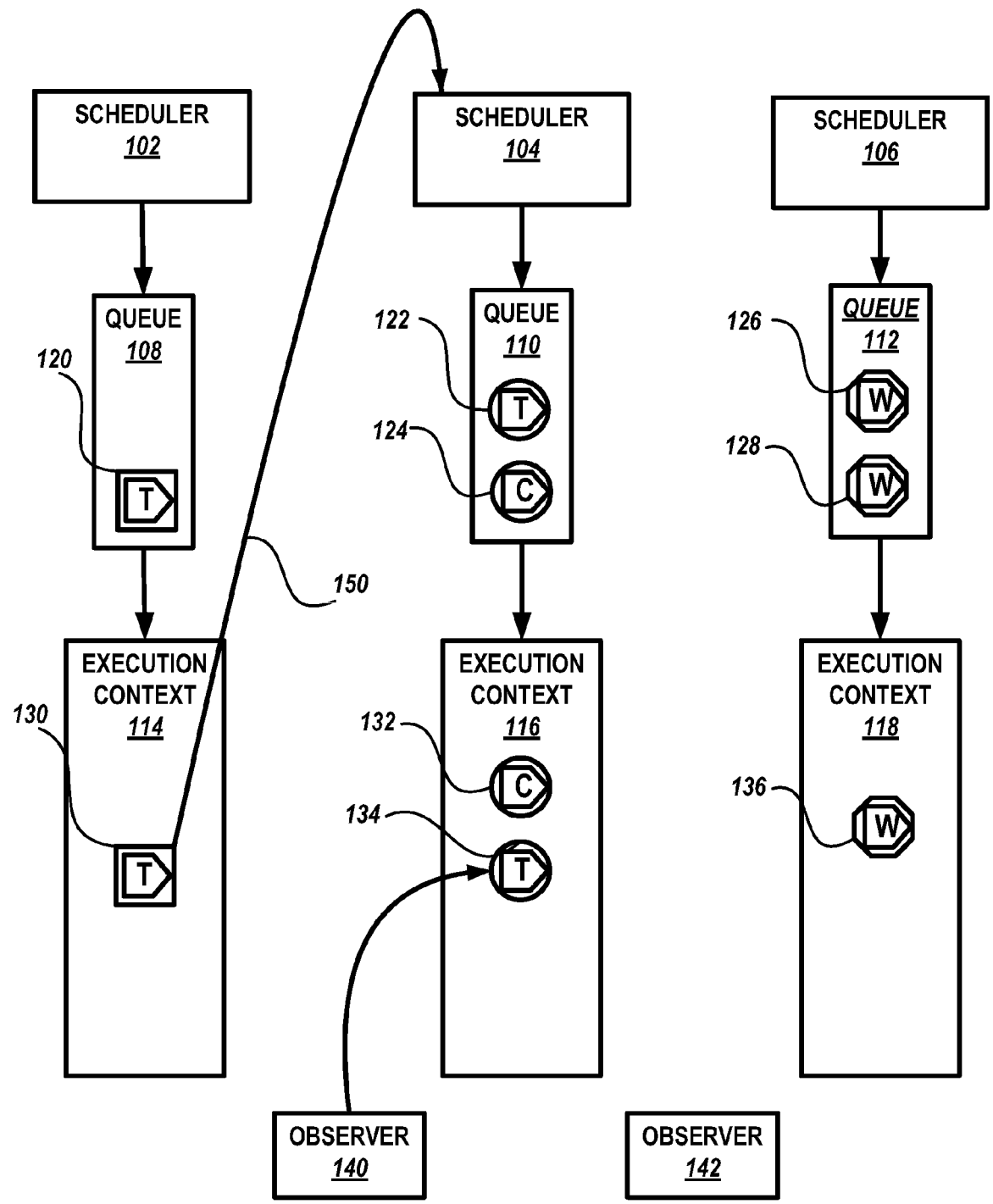
FIG. 1 is a block diagram illustrating an example embodiment of a computing system for controlling execution context scheduling.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "computer program," or simply "program" refers to a computer program or a portion thereof, and may include associated data. A program may be an independent program, or it may be designed to provide one or more features to another application. An "add-in" and a "plug-in" are examples of programs that interact with and provides features to a "host" program.

A program is made up of any combination of program components, which may include program instructions, data, text, object code, images or other media, security certificates, scripts, or other software components that may be installed on a computing device to enable the device to perform desired functions. Program components may exist in the form of files, libraries, pages, binary blocks, or streams of data.

As used herein, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include any one or more of these. As used herein, "calling" a function and "invoking" a function are synonyms.

As used herein, the term "execution context" refers to a context, environment or location within which executable program instructions can be executed. In some embodiments, an execution context may encapsulate state or other resources. Examples of execution contexts include a computing device, a processor, a processor core, a hardware or software thread, a pool of threads, or the like. Execution contexts may be nested. For example, a computing device as an execution context may include multiple processor cores, each considered an execution context, and each core having multiple threads considered to be execution contexts. Execution includes direct execution by a processor, interpretation by an interpreter, simulator, or virtual processor, or the like.

A "push-based stream" is a collection of one or more observable software objects, referred to as "observables." An event, or "push notification," referred to herein simply as a "notification," represents an observable. In a push-based system, a notification may trigger actions by some executable code that is a handler of the notification. Notifications in a push-based system facilitate asynchronous programs, in which a first portion of a program may be executing such that when a notification occurs asynchronously, a handler may execute in response, possibly concurrently with the first portion of the program.

An event, or push notification, is said to "originate" or to "occur" with respect to the discussion herein when a processor performs some actions that represent the initial existence of the notification. This may be done in response to a signal, such as from an input device or one triggered by software. In some systems, data is generated that represents the push notification. Actions related to a notification origination occur in one or more execution contexts, such as a thread, process, or computing device.

An event, or notification is said to "complete" or be "handled" or processed when it is processed by a function or program segment that is associated with the notification. The function or program segment is referred to as a "handler" or "observer" of the notification. The completion of a notification includes performing actions in one or more execution contexts associated with the notification at the time of completion. A notification may be associated with an execution context by a scheduler or other component that performs association actions. In some implementations, an execution context may have one or more queues or other data structures that contain notifications, or references to notifications, associated with the execution context. Notifications may be extracted from the queue at the time of handling.

A notification that switches between execution contexts is said to undergo "context hopping" between notifications. Context hopping may cause a notification that originates in an execution context to complete in a different execution context.

FIG. 1 is a block diagram illustrating an example embodiment of a computing system 100 for controlling execution context scheduling. In various embodiments, computing system 100 may be implemented with one or more computing devices configured in a variety of ways.

In the illustrated computing system 100, each of schedulers 102, 104, and 106 receive a specification of a notification and add the notification to a corresponding notification queue 108, 110, or 112, respectively. Each notification queue serves as an input queue for a corresponding execution context 114, 116, or 118, respectively.

Notifications 120-136 represent notifications that may occur and be processed in computing system 100. Each notification originates in an execution context. The notification may be processed by an observer 140 or 142.

An observer includes one or more functions that are invoked with respect to the input notification. Each observer executes in the execution context that the input notification is scheduled on. A notification may originate on a first execution context and be processed by an observer on the same execution context or a different execution context. By default, a notification is processed by an observer on the same execution context where it originates. However, mechanisms described herein enable a notification to be scheduled on a different execution context, so that it is processed on a different execution context than the one in which it originates. An observer may be invoked and execute on more than one execution context, each invocation corresponding to an associated notification.

In the example of FIG. 1, notification 130 is shown originating in execution context 114. Arrow 150 indicates that notification 130 is transferred to scheduler 104, corresponding to execution context 116. Thus, notification 130 originates in execution context 114 and is processed in execution context 116.

In the example of FIG. 1, notification 120 is in queue 108, waiting processing in execution context 114; notifications 122 and 124 are in queue 110, waiting processing in execution context 116; notifications 126 and 128 are in queue 112, waiting processing in execution context 118 Notifications 132 and 134 are shown in execution context 116. Notification 136 is shown in execution context 118.

Each notification is illustrated with a rectangle, circle, or octagon surrounding it, representing its corresponding execution context. A rectangle represents execution context 114; a circle represents execution context 116; an octagon represents execution context 118. Thus a notification may originate with a rectangle representing execution context 114 and, after transferring to execution context 116, be shown with a circle.

Figure 2:
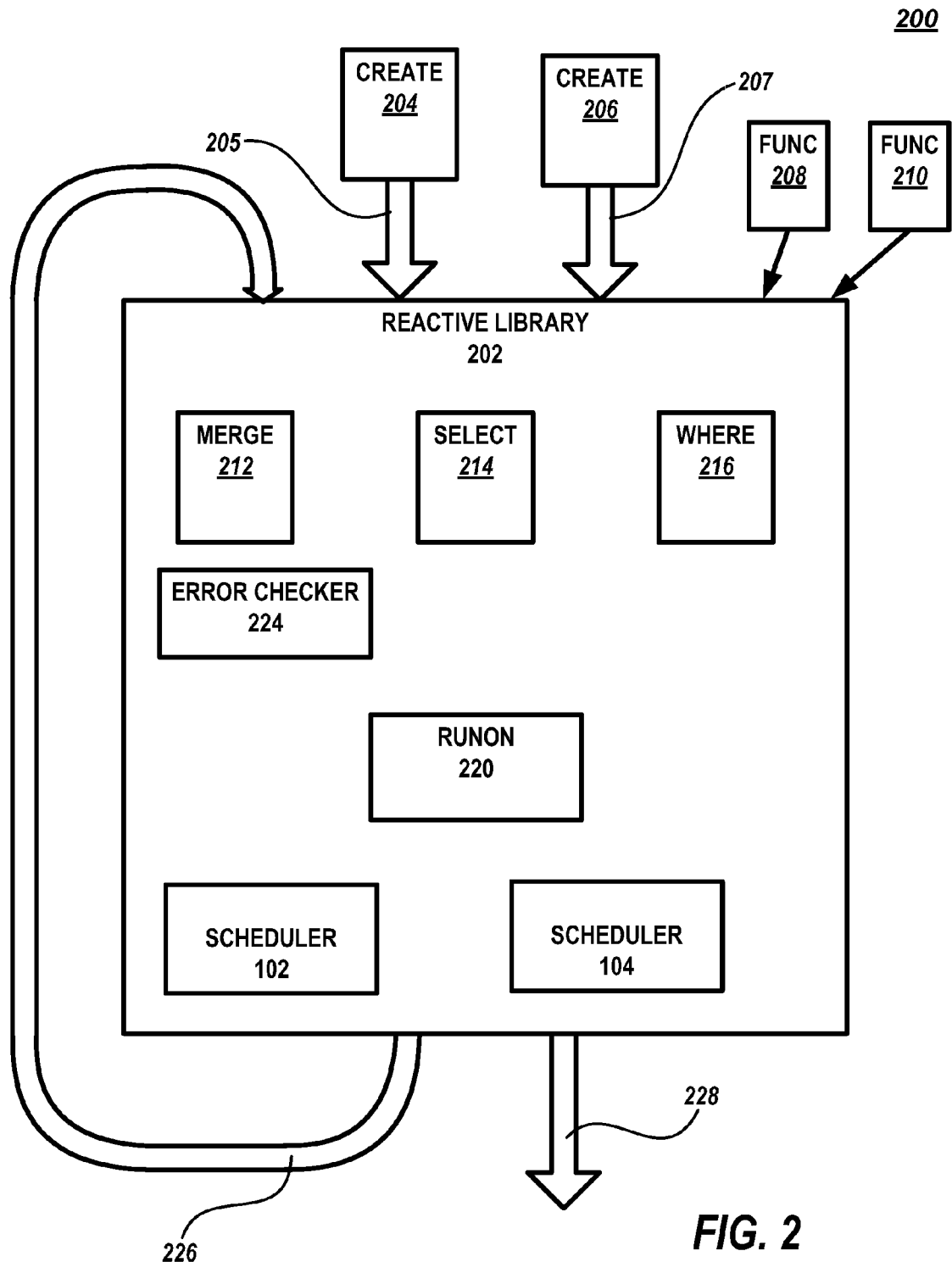
FIG. 2 is a block diagram illustrating an example embodiment of a system for controlling execution context scheduling.

FIG. 2 is a block diagram illustrating an example embodiment of a computing system 200 for controlling execution context scheduling. Computing system 200 may operate in conjunction with computing system 100 of FIG. 1, or a variation thereof. In various embodiments, computing system 200 may be implemented with one or more computing devices configured in a variety of ways.

Example computing system 200 includes reactive library 202. Reactive library includes a number of components that perform various functions. Some of these components receive a push-based stream as input, perform some processing, and generate a modified push-based stream as output. For example, a select component 214 may receive a stream of notifications and perform actions that operate as a filter, selecting from among the notifications of the push-based stream based on a configuration of the select component. Select component 214 may receive parameters or functions such as functions 208-210 that specify the filter logic to be applied to input notifications. The output of select component 214 may be a push-based stream. In one embodiment, the execution contexts corresponding to each notification are not modified by select component 214, so that the notifications that are included in the output push-based stream have the same execution context as they did when they were processed by select component 214.

Merge component 212 may receive two or more push-based streams and merge them together to create a merged push-based stream. In one embodiment, the execution contexts corresponding to each notification are not modified by merge component 212, so that the notifications that are included in the output push-based stream have the same execution context as they did when they were processed by merge component 212. Thus, the output push-based stream of merge component 212 may include notifications of one or more execution contexts.

Merge component 212 is an example of a push-based stream combination component in that it receives two or more push-based streams and combines them to form a single push-based stream. A concatenate component is another example of a combination component. It may receive multiple push-based streams and combine them in successive order, so that all of the notifications in the first stream come before all the notifications of the second stream, and so forth. A zip operator may combine push-based streams so that a first notification from each push-based stream is ordered before the second notification from each push-based stream, the second notification from each stream is ordered before the third notification from each stream, and so forth.

Where component 216 may receive one or more input push-based streams or input functions, such as functions 208-210, and produce an output push-based stream. It may use the input function as a filter on the input push-based stream, so that the output push-based stream is a filtered transformation of the input push-based stream.

RunOn component 220 modifies notifications of a push-based stream so that they correspond to a specified execution context. RunOn component 220 is considered a context hopping component in that it may cause a notification that originates in a first execution context to complete in the specified execution context, the specified execution context may differ from the first execution context. In one embodiment, RunOn component 220 receives an input push-based stream and takes actions to facilitate one of schedulers 102 or 104 scheduling the notifications on the execution context corresponding to the scheduler. This may include generating an output push-based stream and associating this push-based stream with a specified scheduler. In one embodiment, a specified scheduler may be passed to RunOn component 220 as an argument along with a specification of a push-based stream.

Reactive library 202 may include error checker 224, which performs actions to determine whether an association of a notification with an execution context is considered to be an error. Error checker 224 may notify a user of the error, thereby facilitating debugging of a program. Further details of error checker 224 are described herein.

As illustrated in FIG. 2, computing system 200 may include one or more create components 204 and 206 that generate notifications to be processed by the system. Each create component includes logic that is specific to a corresponding notification. Create components may insert each notification into a push-based stream that is further processed by the system. As illustrated, create component 204 inserts notifications into a corresponding push-based stream 205; create component 206 inserts notifications into push-based stream 207. Notifications may correspond to a user input action, such as a mouse click, a keyboard selection, or an audio command. Other example of notifications include a timer, a received message or signal, or the like.

Each create component may be configured to insert notifications having a configured execution context. For example, user interface notifications may be created with an associated user interface thread, so that each notification originates in the UI thread. In another example, a message receiving create component may be configured to place notifications on a designated thread or a pool of threads.

In one embodiment, the output of some of the components of reactive library 202 may include push-based stream 226. For example, each of merge component 212, select component 214, 216, or RunOn component 220 may produce a push-based stream from their respective input push-based stream. The output push-based stream may become an input push-based stream to reactive library 202 or to another component, thereby enabling additional processing. The output of scheduler 102 may be a push-based stream that becomes input to a notification queue, such as notification queues 108, 110, or 112 of FIG. 1.

The output of some of the components of reactive library may be push-based stream 228, which may be processed by another component, such as observer 140 or 142. The execution context in which this processing is performed is based on the logic and specifications of the reactive library components, as described herein.

Having push-based streams as both the input and output of various components facilitates composition in a programming language. In such an architecture, a first function produces a result of some type and a second function receives input of the type produced by the first function. The two functions may be combined so that the second function directly receives its input from the output of the first function, or the output of the first function may be assigned to a first class variable for subsequent input to the second function. By having components in which operators received a push-based stream as input and produce a push-based stream, the operators can be combined in a variety of ways.

For example, in one embodiment, a programming language may include a statement such as:
    xs=merge (timer.RunOn (UI), ws.RunOn(UI));

This statement uses the RunOn component to specify that a timer push-based stream is to be processed on a UI thread and that a ws push-based stream is to be processed on the UI thread. The outputs of the timer.RunOn(UI) invocation and the ws.RunOn(UI) invocation are themselves notification threads that are arguments to the merge component that is to run on the UI thread. An alternate way of specifying the desired actions may be:
    xs=merge (timer, ws).RunOn (UI);

This statement first specifies the merge operation, resulting in a push-based stream with notifications in different threads. It then passes the output push-based stream to the RunOn component, causing all notifications to be scheduled on the UI thread. It allows the timer and ws notifications to originate on their original thread, and then complete on the UI thread. These two statements may cause the same result, though different logic is employed in each clause. Another way of specifying these actions may be:
    uistream=timer.RunOn (UI);
    wsstream=ws.RunOn (UI);
    xs=merge (uistream, wsstream);
in which each push-based stream is first put onto the UI thread, and then merged to form a single push-based stream with notifications on the UI thread. The push-based streams produced by each RunOn invocation are assigned to respective variables and separated from the invocation of the merge operator.

Figure 3:
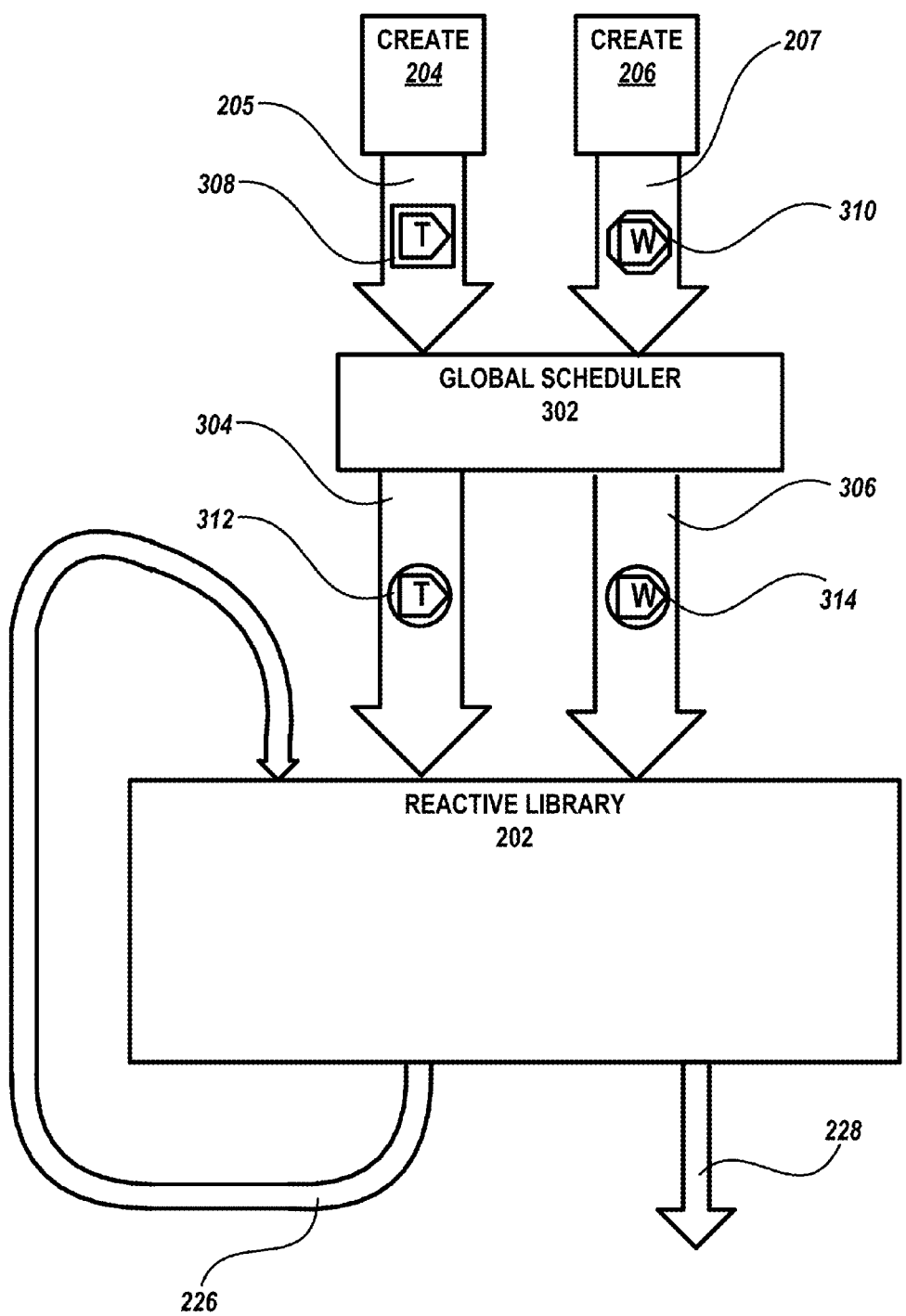
FIG. 3 is a block diagram illustrating a system for controlling execution context scheduling.

FIG. 3 is a block diagram illustrating a system 300 for controlling execution context scheduling. System 300 is an example of a configuration of computing system 200, implementing a policy referred to as a "strict" policy. In the strict policy, a global scheduler is configured so that notifications are transferred to a specified execution context, regardless of the execution context in which they originate. As described with respect to FIGS. 1 and 2, system 300 includes reactive library 202, create components 204 and 206, as well as push-based streams 205 and 207 that include notifications originating from corresponding create components 204 and 206, respectively.

As illustrated in FIG. 3, global scheduler 302 receives push-based streams from one or more create components and transforms the push-based streams so that the notifications are processed in a specified execution context. For example, push-based stream 205 is shown including notification 308, which originates in a "rectangle" execution context. Global scheduler 302 performs actions to transform push-based stream 205 into push-based stream 304, with notifications such as notification 312 that are processed in the "circle" execution context. Similarly, push-based stream 207 includes notifications originating from create component 206, such as notification 310, which originates in the "octagon" execution context. Global scheduler 302 transforms push-based stream 207 into push-based stream 306, with notifications such as notification 314 that are processed in the "circle" push-based stream. Thus, the push-based stream inputs to reactive library 202 are processed in the "circle" push-based stream. As described with respect to FIG. 2, the outputs of reactive library 202 may include push-based stream 226, which becomes input to reactive library 202, or push-based stream 228, which may become input to an observer function or other component.

By employing a global scheduler that causes notifications from various sources to be scheduled in a specified execution context, program errors resulting from the processing of notifications in an incorrect execution context may be avoided. For example, in FIG. 3, the specified "circle" execution context may be the user interface thread. Push-based stream 205 may include timer notifications that originate on a TH_timer thread. Push-based stream 207 may include message receipt notifications that originate on a worker thread. By transforming the notifications of each push-based stream into notifications that are configured to be processed on a UI thread, the handlers for any of these notifications may perform actions to update the user interface. Additionally, by having the reactive library functions as composite functions, various operations, such as merging or filtering, may be combined and performed on any of the notification threads.

Figure 4:
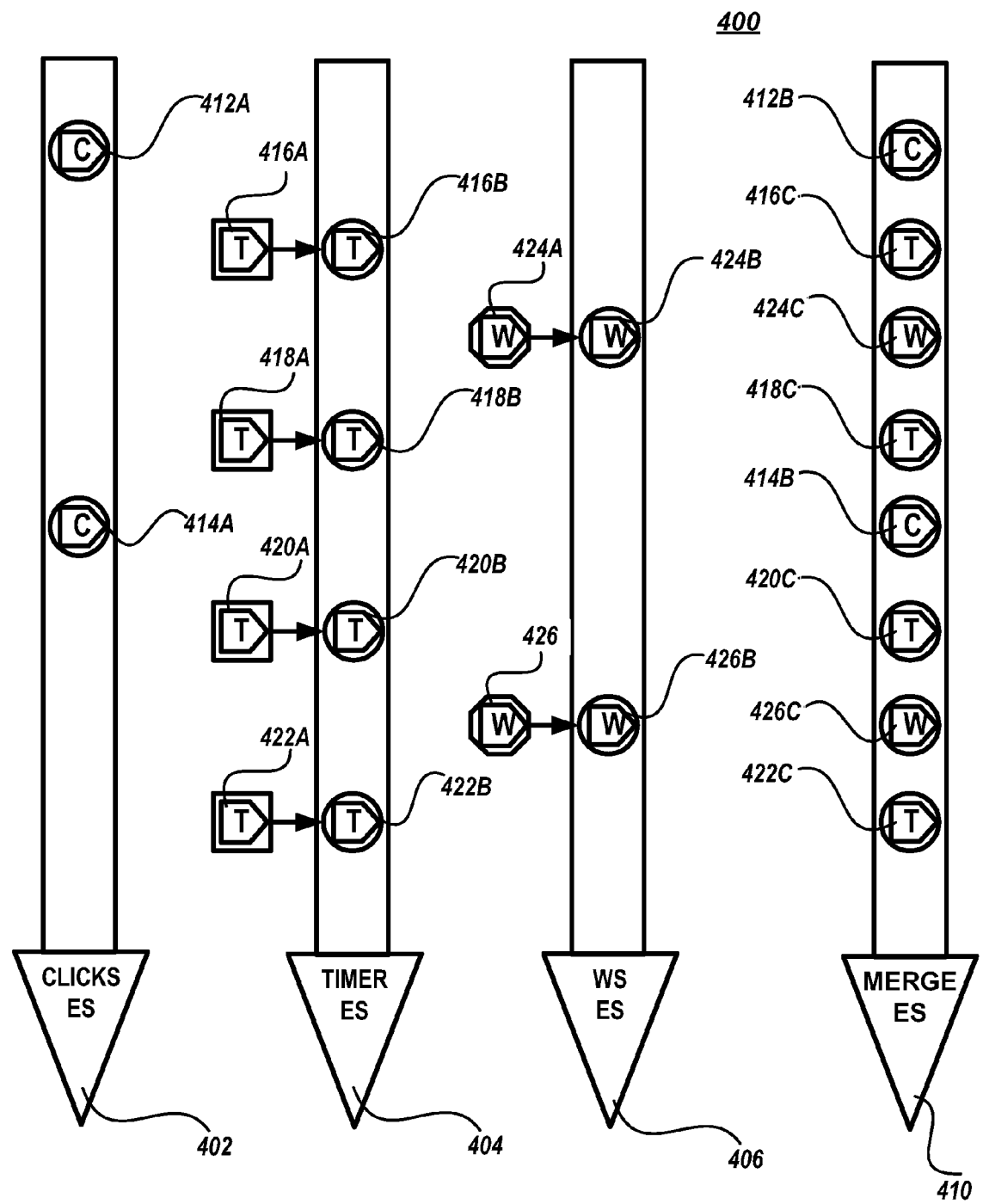
FIG. 4 illustrates an example computer environment with a merge operation performed on three push-based streams when employing a strict policy.

FIG. 4 illustrates an example computer environment 400 with a merge operation performed on three push-based streams when employing a strict policy. Example computer environment 400 includes clicks push-based stream 402, timer push-based stream 404, and WS push-based stream 406. Merge push-based stream 410 illustrates a result of applying a strict policy and performing a merge operation on clicks push-based stream 402, timer push-based stream 404, and WS push-based stream 406. Notifications in each push-based stream are ordered by their occurrence, with time increasing downward in the figure. In one embodiment, a source level statement that represents this merge operation may be:

es=merge(clicks, timer, ws);

where clicks, timer, and ws represent push-based streams, and the variable es is of type push-based stream. Thus, the result of the merge operation is a new push-based stream. In the example statement, the merge push-based stream is returned by the merge operator and assigned to the variable es.

FIG. 4 illustrates example notifications 412-426. Each notification is illustrated in two or more states as a result of mechanisms described herein. Notifications having like numbers represent the same notification, though possibly transformed.

Click notifications 412A and 414A represent button click notifications that may occur on a UI thread. They are illustrated within a circle, the circle representing the UI thread and indicating that each of these notifications originates in the UI thread.

Timer notifications 416A, 418A, 420A, and 422A represent timer notifications that may occur on a TH_timer thread. They are illustrated within a rectangle, the rectangle representing the TH_timer thread and indicating that each of these notifications originates in the TH_timer thread. As discussed herein, when employing the strict policy, each notification is transformed to be processed in the target execution context, regardless of its origination. In the example of FIG. 4, each of the timer notifications is transformed to be processed in the UI thread. Thus, timer push-based stream 404 includes timer notifications 416B, 418B, 420B, and 422B, representing transformations of respective notifications 416A, 418A, 420A, and 422A.

WS notifications 424A and 426 represent Web server notifications that may occur on a Web server thread. These notifications might be triggered by actions such as a receipt of a message from a remote device. They are illustrated within an octagon, the octagon representing the TH_ws thread and indicating that each of these notifications originates in the TH_ws thread. In the example of FIG. 4, each of the WS notifications is transformed to be processed in the UI thread. Thus, WS push-based stream 406 includes WS notifications 424B and 426B, representing transformations of respective notifications 424A and 426A.

Merge push-based stream 410 includes each of the click notifications, timer notifications, and WS notifications in their most recent transformation. In the illustrated embodiment, these notifications are not transformed by the merge operation. Thus, click notifications 412B and 414B remain in the UI thread; timer notifications 416C, 418C, 420C, and 422C remain in the UI thread as they were in the timer push-based stream; WS notifications 424C and 426C remain in the UI thread as they were in the WS push-based stream. Merge push-based stream 410 includes a stream of different notifications, all configured to be processed in the UI thread.

Variations of computer environment 400 may include specification of an execution context other than the UI thread. The execution contexts may be other than threads, as discussed herein. In some embodiments, a merge operation may receive any number of push-based streams as input streams.

Figure 5:
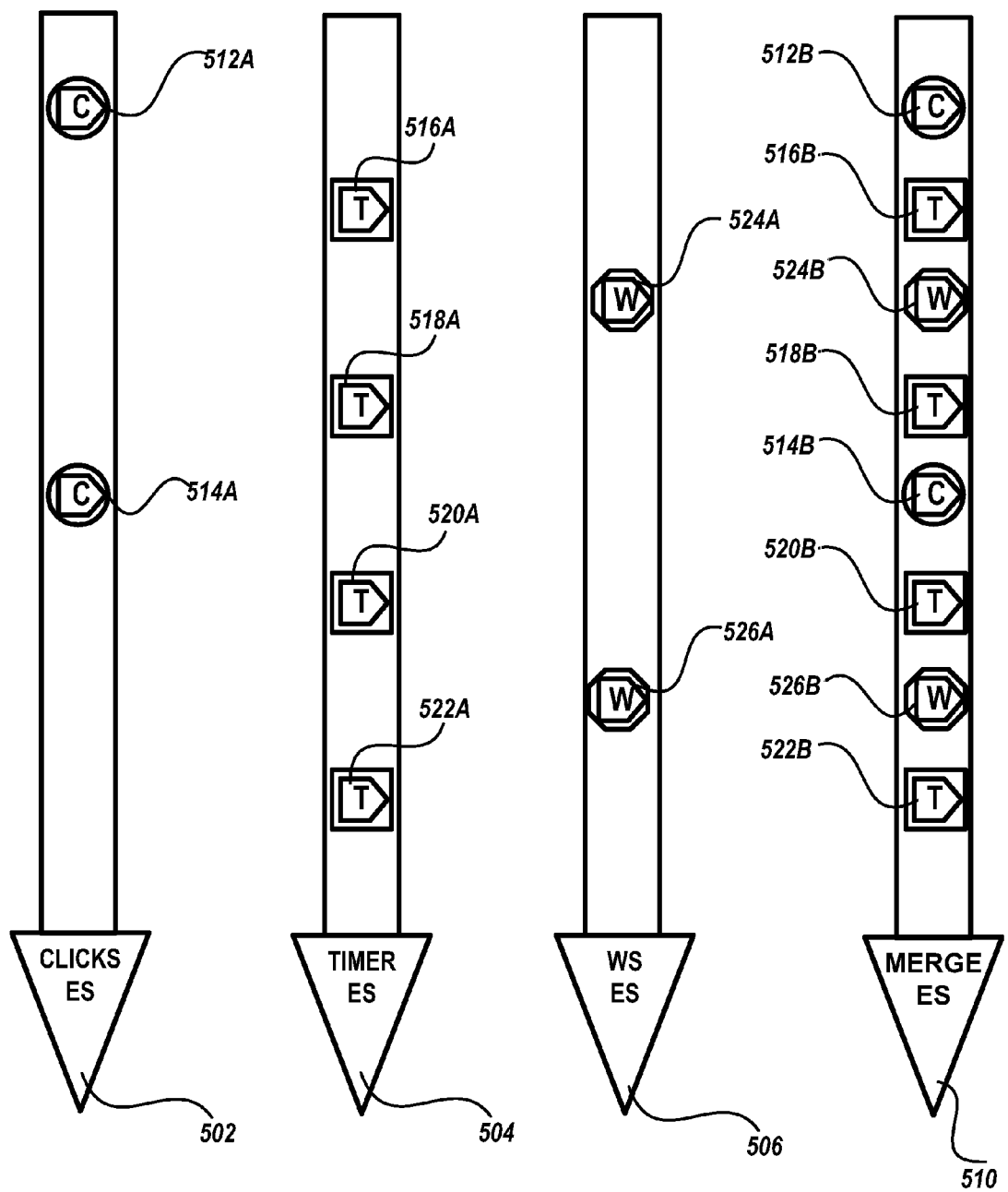
FIG. 5 illustrates an example computer environment with a merge operation performed on three push-based streams without a strict policy.

For comparison, FIG. 5 illustrates an example computer environment 500 with a merge operation performed on three push-based streams without a strict policy. Example computer environment 500 includes clicks push-based stream 502, timer push-based stream 504, and WS push-based stream 506. Merge push-based stream 510 illustrates a result of applying a strict policy and performing a merge operation on clicks push-based stream 502, timer push-based stream 504, and WS push-based stream 506. In one embodiment, a source level statement that represents this merge operation may be the same as described for the strict policy example of FIG. 4.

FIG. 5 includes example click notifications 512A and 514A, as described for the click notifications of FIG. 4. It further includes timer notifications 516A, 518A, 520A, and 522A, as described for the timer notifications of FIG. 4. However, the timer notifications are not transformed to a different execution context, and remain on the TH_timer thread.

Similarly, WS notifications 524A and 526A originate and remain on the TH_ws thread. After a merge operation, notifications 512B-526B are included in merge push-based stream 510, though each notification remains in the execution context where it originated. In some programs that include a configuration such as that of FIG. 5, an error may result when a handler for one of the notifications attempts to perform an operation in an incorrect execution context.

Figure 6:
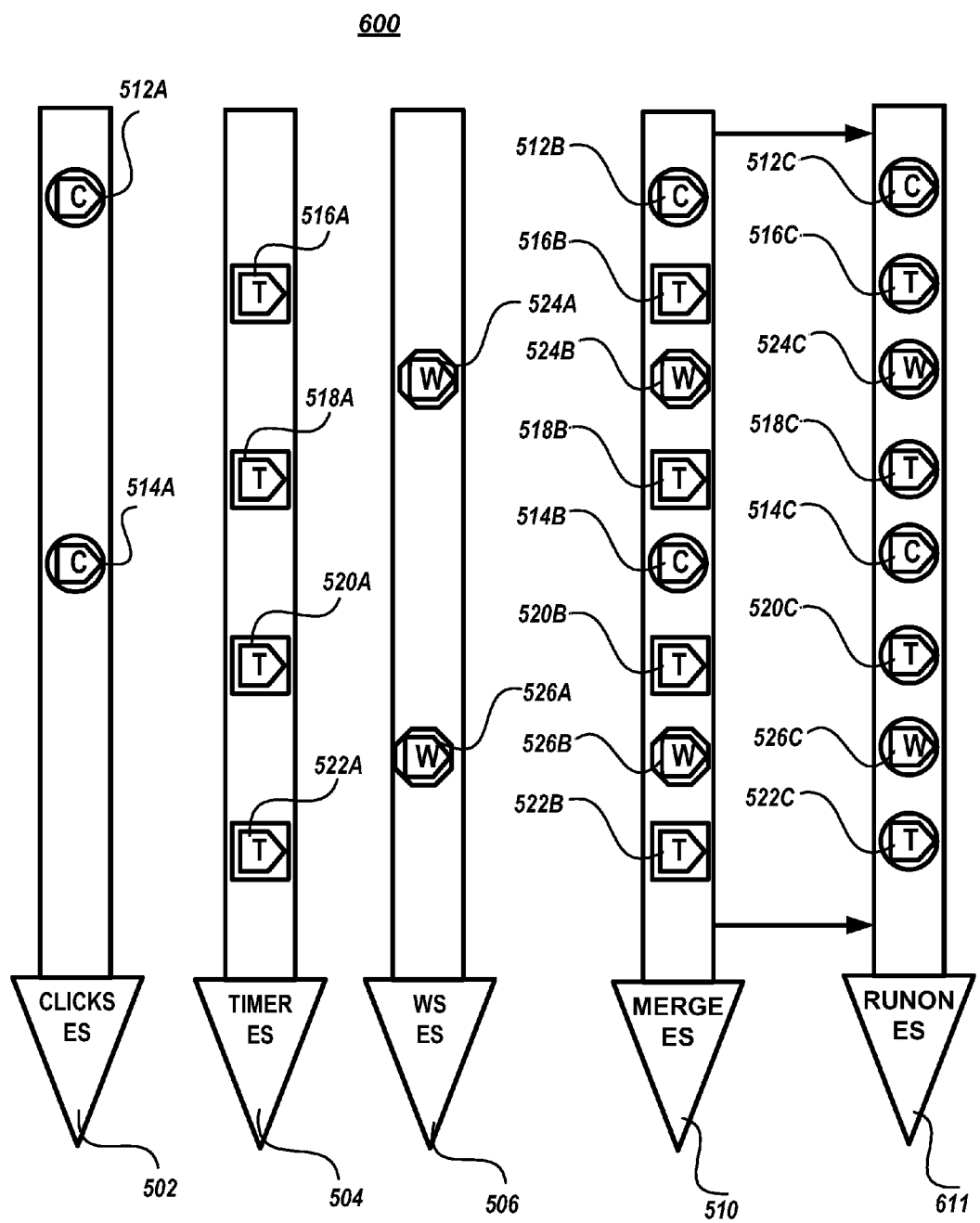
FIG. 6 illustrates an example computer environment with a merge operation performed on three push-based streams, combined with the use of a RunOn operator.

FIG. 6 illustrates an example computer environment 600 with a merge operation performed on three push-based streams combined with the use of a RunOn operator to transform the merged push-based stream. In the example computer environment 600, clicks push-based stream 502, timer push-based stream 504, WS push-based stream 506, and merge push-based stream 510, including the illustrated notifications 512A-522A and 512B-522B are as described for FIG. 5. In addition, a RunOn operator transforms the merged push-based stream to produce RunOn push-based stream 611. In one embodiment, a source level statement that represents the merge and RunOn operations may be:

res=merge (clicks, timer, ws).RunOn (UI);

where clicks, timer, and ws represent push-based streams, the variable res is of type push-based stream, and RunOn is a method that receives an input stream and an execution context specification, producing a new transformed push-based stream. At least a portion of the actions of the RunOn method may be performed by RunOn component 220 of FIG. 2.

Push-based stream 611 includes notifications 512C-526C. These are the same notifications as corresponding notifications 512B-526B, respectively, though the notifications that were not already on the UI thread are transformed to be processed on the UI thread. Thus, all of the example notifications 512C-526C are to be processed on the UI thread. It is to be noted that, at the execution of the statement invoking the RunOn operator, the notifications may not have occurred yet. The RunOn operator takes actions to configure the push-based stream so that when the notifications occur, they will be processed in the UI thread.

It is to be noted that the configuration of RunOn push-based stream 611 is equivalent to merge push-based stream 410 of FIG. 4. In this example, the use of the strict policy and the use of the RunOn operator provide alternate techniques for causing an equivalent push-based stream with respect to execution context assignments. However, in some embodiments, use of the RunOn operator provides greater flexibility of notification control. For example, in a single program, the RunOn operator may be used as illustrated in FIG. 6 for a first specified execution context and also used with other push-based streams to a second specified execution context. Still other notifications may be left to complete in their original execution context. Thus, RunOn facilitates context hopping with greater flexibility than the strict policy.

The use of a RunOn operator does not preclude logical errors in a program. Notifications that are not designated to be processed in a correct execution context may result in an error when they are handled. In some program configurations, the difference between the processing of execution contexts and the handling of notifications may cause complexity when debugging such errors. For example, two or more streams may be merged in a way that maintains some notifications in an execution context with a resulting error when processed by a handler. In one embodiment, the error is not known until the processing by the handler. Therefore, in some program configurations, use of the RunOn operator may result in complexity during program debugging.

In one embodiment, an error-detecting component, such as error checker 224 of FIG. 1, may operate in conjunction with some operators to detect errors with respect to execution contexts. For example, in one embodiment, a merge component may employ an error checker that determines whether all of the merged notifications are in a common execution context. It may cause an exception if this does not occur. In this embodiment, a programmer may become aware of logic errors at an earlier stage of program development or debugging.

In one embodiment, a system may provide three sets of reactive library components. A first set may apply a "strict" policy, in which all notifications are configured to be processed in a common specified execution context. FIG. 3 illustrates an example of a strict policy. A second set of components may apply a "permissive" policy, in which a program may include operators that perform execution context hopping. The operators facilitate performing operations on push-based streams, though the operations may result in notifications processed in an incorrect execution context. A programmer has a great amount of flexibility, with accompanying risks of such flexibility.

A third set of components may apply a "hybrid" policy, in which a program may include operators that perform execution context hopping, and one or more error checkers include logic to detect at least some erroneous configurations. The example of a merge component that employs an error checker to determine whether the merged notifications are in a common execution context may be included in a hybrid policy.

Figure 7:
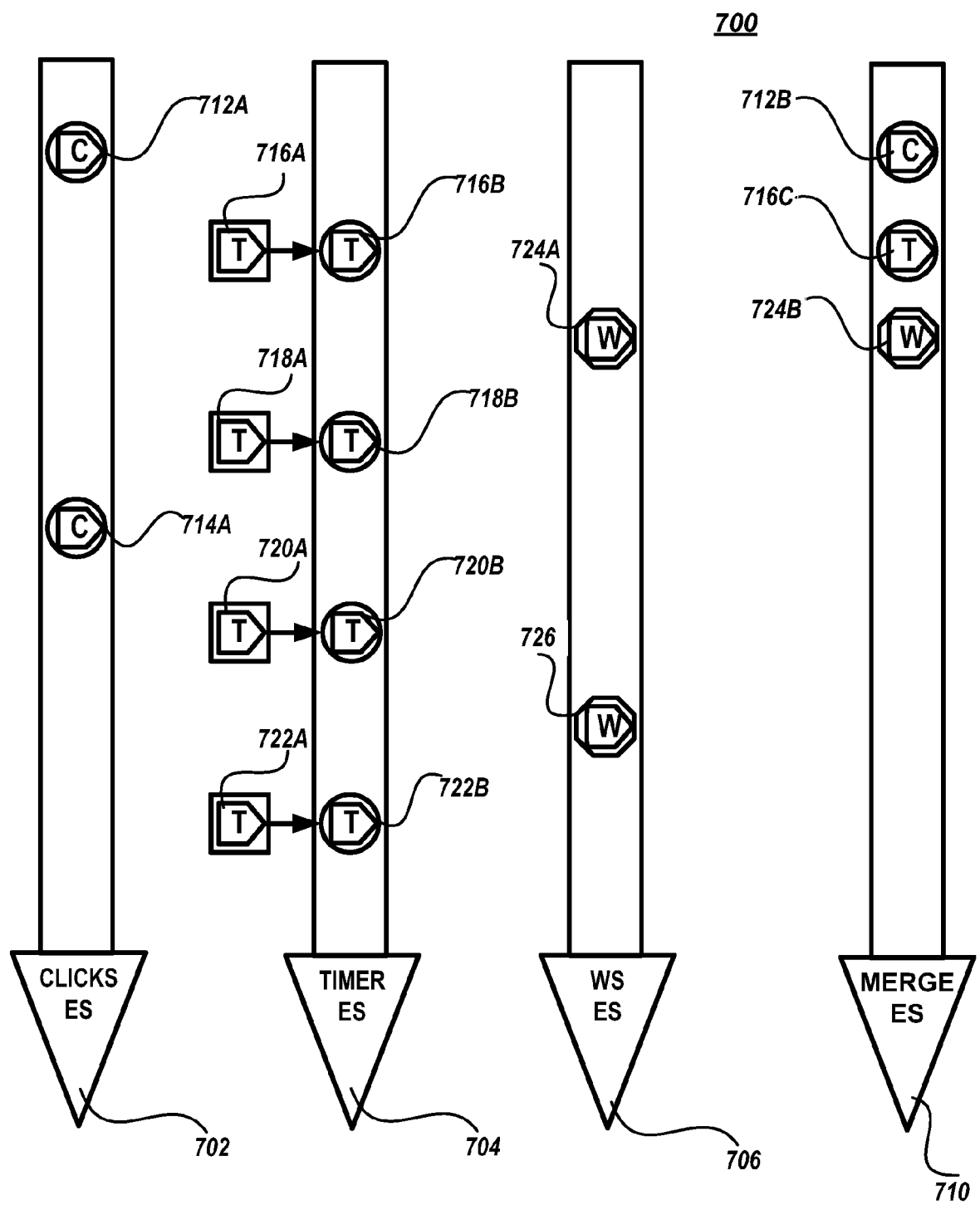
FIG. 7 illustrates an example computer environment with the use of a RunOn operator and a merge operation that may result in an error.

In one embodiment of a hybrid policy, the configuration of FIG. 5 may cause an error at the time that the push-based streams are merged, as a result of mixing notifications with different execution contexts in the merge operation. FIG. 7 illustrates an example computer environment 700 with the use of a RunOn operator and a merge operation that may result in an error due to the programming logic. The example computer environment 700 may result from the use of a source language statement such as res=merge(clicks, timer.RunOn(UI), ws));

In the example computer environment 700, clicks push-based stream 702, timer push-based stream 704, and WS push-based stream 706 are merged to form merge push-based stream 710. Clicks push-based stream 702 includes notifications 712A-714A. Timer push-based stream 704 includes notifications 716A-722A. WS push-based stream 706 includes notifications 724A-726A. Merge push-based stream 710 includes notifications 712B and 716C. However, when WS notification 724B is merged, the error checker may determine that this is an error, because it is on a different thread than the first notification, notification 712B. This occurred because WS push-based stream 706 is not transformed to execute on the UI thread. The program may avoid this error by using a statement such as res=merge (clicks, timer.RunOn(UI), ws.RunOn(UI));

in which the WS notifications as well as the timer notifications are transformed prior to performing the merge operation, so that the merge receives input streams having a common execution context. Alternatively, the program could use the statement res=merge(clicks, timer, ws).RunOn (UI);

which may be processed similar to the statement res=merge(clicks.RunOn(UI), timer.RunOn(UI), ws.RunOn(UI));

thereby avoiding an error when the merge operation is performed.

One embodiment may provide three sets of capabilities, corresponding to the strict policy, permissive policy, and hybrid policy. Various embodiments may provide one or two of these policies, combine aspects of the policies in various ways, or subdivide one or more of the policies. Discussions herein of each of these policies, or combinations thereof, are to be considered discussions of various functionality, and do not suggest a limitation to the particular groupings described herein. For example, one embodiment may enable use of a permissive policy in one portion of a program and use of the hybrid policy in another portion; one embodiment may disallow such a combination or cause an error if such a combination is used.

Referring back to FIG. 4, this figure has been described herein as illustrating a strict policy, in which all notifications are transferred to a specified execution context prior to processing. This figure may also be used to illustrate, in one embodiment, a result of processing a source statement such as res=merge (clicks, timer.RunOn(UI), ws.RunOn(UI));

As shown in FIG. 4, the timer notifications are transferred to the UI thread after origination; the WS notifications are also transferred to the UI thread. Thus, with respect to this example, use of the strict policy or the hybrid policy may cause similar results. In one embodiment, the hybrid policy differs in that it may allow another statement to specify that other notifications are to be processed on a thread other than the UI thread. A programmer may therefore select a policy to use based on the desires or requirements of a particular program.

In some embodiments, a program may use a mechanism called "execution context boxes," also referred to herein as "boxes." A box provides a way to cause notifications to be processed in a specified execution context.

Figure 8:
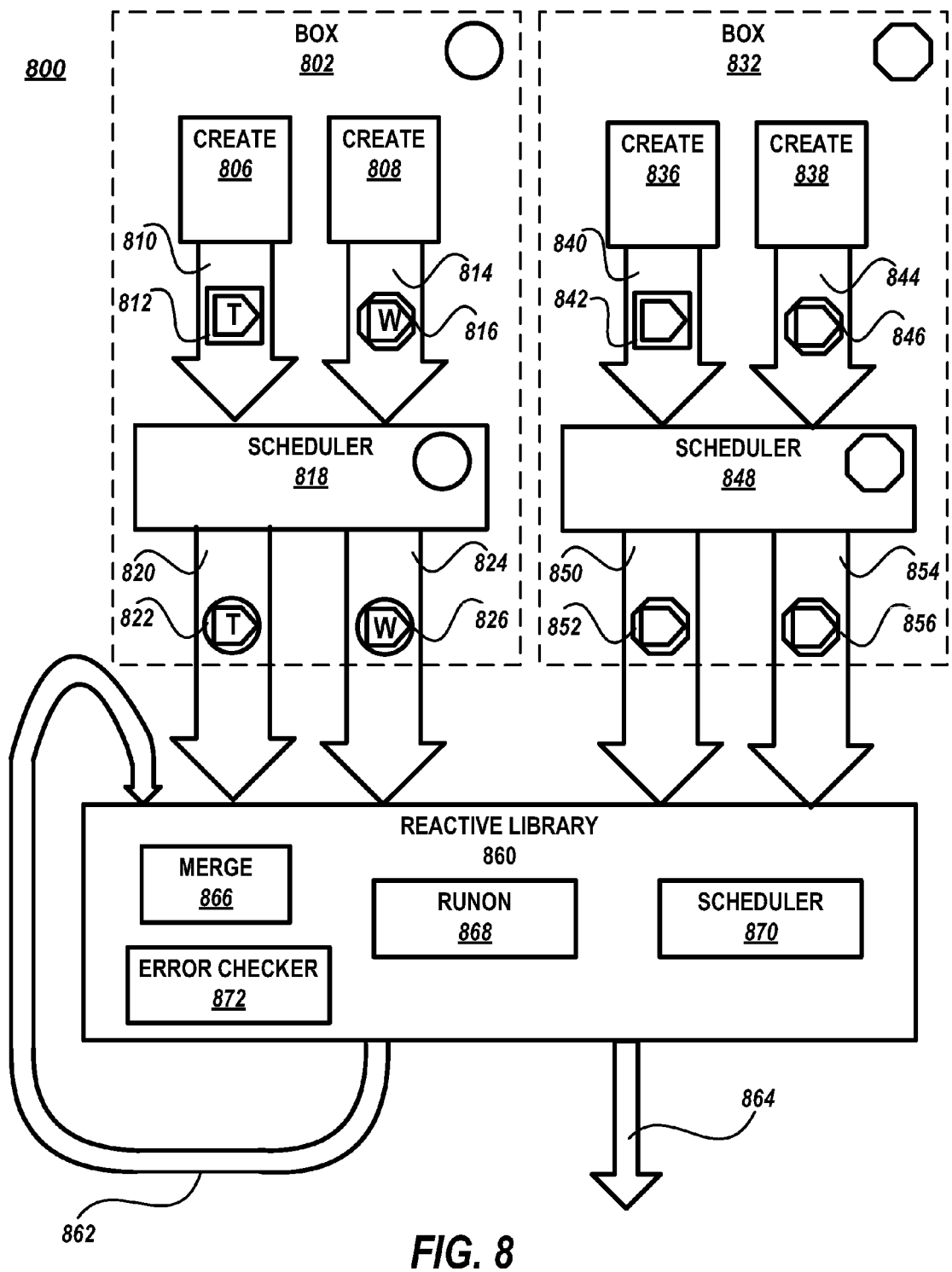
FIG. 8 is a block diagram illustrating an example system having multiple execution context boxes.

FIG. 8 is a block diagram illustrating an example system 800 having two execution context boxes 802 and 832. Box 802 is referred to herein as "circle" box 802, as indicated by a circle in the upper right corner. The circle represents a UI thread as an example of an execution context, thought it could represent any thread or any execution context. Circle box 802 is thus configured with a specification of a UI thread as its execution context. Circle box 802 includes create component 806, which produces an output stream 810 including timer notifications 812 that originate on a TH_timer thread. Circle box 802 also includes create component 808, which produces an output stream 814 including WS notifications 816 that originate on a TH_ws thread. The notifications produced by create components 806 and 808 are scheduled by scheduler 818 to complete on the UI thread, as indicated by the circle.

Scheduler 818 operates in conjunction with each notification creator in order to modify the notifications to complete on the configured execution context, which is the UI thread in this example. This may be implemented by having notifications from each creator directed toward scheduler 818 for processing. It may be implemented by having scheduler 818 integrated with or interact with each create component 806-808 so that each notification is scheduled on the designated thread prior to release by the creator. The result is that a push-based stream produced by each creator includes notifications that are scheduled to complete in the configured execution context.

As a result of scheduling by scheduler 818, the stream of timer notifications produced by create component 806 is transformed into push-based stream 820, with timer notifications 822 that are configured to complete on the UI thread; the stream of WS notifications produced by create component 808 are transformed into push-based stream 824, with WS notifications 826 that are configured to complete on the UI thread. As illustrated, all notifications created within circle box 802 are configured to complete on the UI thread. They may be processed by components in reactive library 860, such as merge component 866 or RunOn component 868 as described herein.

FIG. 8 further includes octagon box 832, which produces notifications that complete on the TH_ws thread. Octagon box 832 includes create component 836, which produces an output stream 840 including a push-based stream 840 of timer notifications 842 that originate on a TH_timer thread. Octagon box 832 also includes create component 838, which produces a push-based stream 844 including WS notifications 846 that originate on a TH_ws thread. The notifications produced by create components 836 and 838 are scheduled by scheduler 848 to complete on the TH_ws thread, as indicated by the octagon.

As a result of scheduling by scheduler 848, the stream of timer notifications produced by create component 836 is transformed into push-based stream 850, with timer notifications 852 that are configured to complete on the TH_ws thread; the stream of timer notifications produced by create component 838 are transformed into push-based stream 854, with WS notifications 856 that are configured to complete on the TH_ws thread. As illustrated, all notifications created within octagon box 832 are configured to complete on the TH_ws thread. They may be processed by components in reactive library 860 as described herein. Push-based streams 820, 824, 850, 854, or any additional push-based streams produced by reactive library components may be output to other components as push-based stream 864. As indicated, output push-based stream 862 may reenter reactive library 860 for additional processing.

In example system 800, push-based streams 820 and 824 may be configured to be input to merge component 866. Because the notifications of both push-based streams are in the UI thread, there will not be an error due to combining notifications of different execution contexts. However, if push-based stream 850 is merged with push-based stream 820 or 824, an error may result due to the combination of notifications from different execution contexts. In one embodiment, error checker 872 may detect an error and provide a notification, as discussed herein. RunOn component 868 may be used in conjunction with scheduler 870 to transform notifications from any of push-based streams 820, 824, 850, or 854. This may be done in order to use merge component 866 with notifications that are all in the same execution context.

A program may have zero, one or more execution context boxes. Each box may have a respective configured execution context, which may differ among the boxes. As illustrated by FIG. 8, push-based streams produced by different creators may be combined, transformed, or otherwise processed with a reactive library operator to produce new push-based streams.

Some embodiments may include one or more error checkers, such as error checker 224 of FIG. 2. An error checker may be integrated with, or work in conjunction with, a reactive library component that processes push-based streams, such as merge component 212, select component 214, where component 216, another combination component, or other component. As described herein, processing of a notification by a handler may result in an error if the handler is performing an action on in an incorrect execution context. An example of an error is modifying a user interface from a thread other than the UI thread. An error checker may determine, at the time that a notification is processed by a reactive library component, whether the notification is configured to complete on an incorrect thread. The error checker may cause an exception, return a status value, or provide a notification in another manner so that a programmer may be aware of the error at this stage of program execution.

An example of a use of an error checker is seen in combination with a merge component. As described herein, a merge combines two or more push-based streams. The notifications on the input push-based streams may be from any execution context. A merge operator may begin processing in the execution context of the first notification that it receives. A merge operator with an error checker may perform an error detection determination in response to each notification, determining whether the notification is on the same thread as the merge operator.

FIG. 5 provides an illustration of how an error checker may work in conjunction with a merge operation. As shown in the merged push-based stream 510, the first notification to be processed is click notification 512B, which is on the UI thread. Therefore, the merge operator begins processing on the UI thread. The next notification to be processed is timer notification 516B, which is on the TH_timer thread. A merge operator in conjunction with an error checker may determine that the receipt of timer notification 516B is an error, based on its execution context. It may cause an exception or provide another notification of this error.

A concatenation operator is another operator that may work in conjunction with an error checker. A concatenation operator may take two or more push-based streams as input, concatenates them, and produce a single push-based stream with the combined notifications from each input push-based stream. The concatenation operator may begin processing in the execution context of the first notification that it receives, and determine, for each subsequent notification, whether it is in the same execution context. If not, it may determine that an error has occurred and provide an error notification.

In one embodiment, an error checker may be provided when operating in the hybrid policy. A program executing in the permissive policy may execute without the operations of an error checker. Some handlers may operate without error even though they are handling notifications on different threads. A permissive policy without execution context error checking allows such a situation, though it may result in errors that are difficult to debug if the program logic is incorrect. A program executing in the strict policy may not have the need for an error checker, due to the restriction of all notifications completing in a common execution context.

Figure 9:
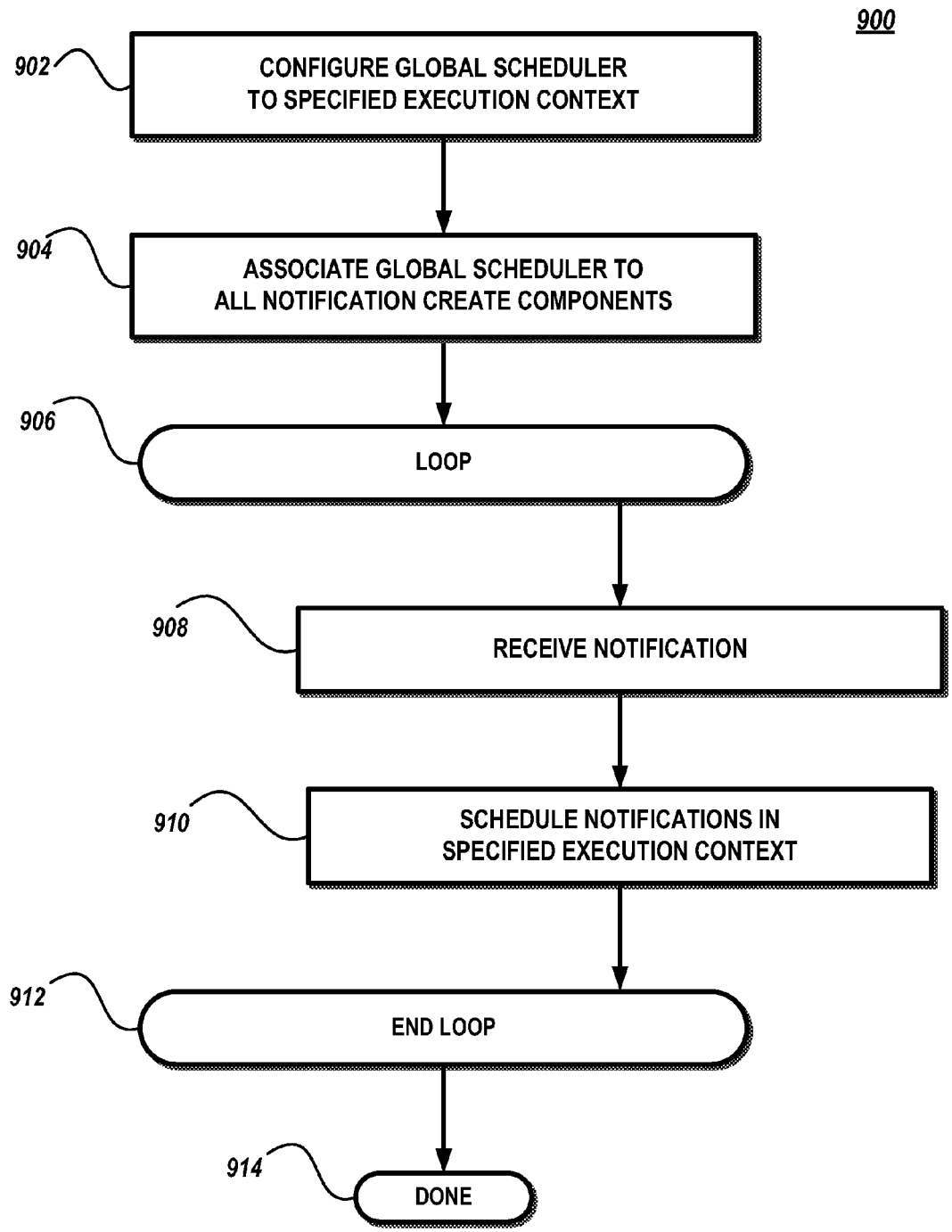
FIG. 9 is a flow diagram illustrating an example embodiment of a process for controlling execution context scheduling in a computer program.

FIG. 9 is a flow diagram illustrating an example embodiment of a process 900 for controlling execution context scheduling in a computer program. In one embodiment, the actions of process 900, or a portion thereof, are performed by computing system 200 of FIG. 2. Process 900, or a portion thereof, may be used to implement a strict policy, as described herein.

The illustrated portions of process 900 may be initiated at block 902, where a global scheduler component, such as global scheduler 302 of FIG. 3, may be configured to a specified execution context. The process may flow to block 904, where the global scheduler may be associated with the notification create components of the computer program. The process may flow to loop 906, which iterates over one or more received notifications produced by the notification create components. In the illustrated embodiment, loop 906 includes boxes 908-912. At block 908, a notification produced by one of the notification create components may be received. The process may flow to block 910, where the received notification is scheduled to be processed in the specified execution context. The process may flow to block 912, which terminates loop 906. The process may flow back to loop 906 to perform another iteration, or exit based on program logic. Upon exiting, the process may flow to done block 914 and exit or return to a calling program.

Figure 10:
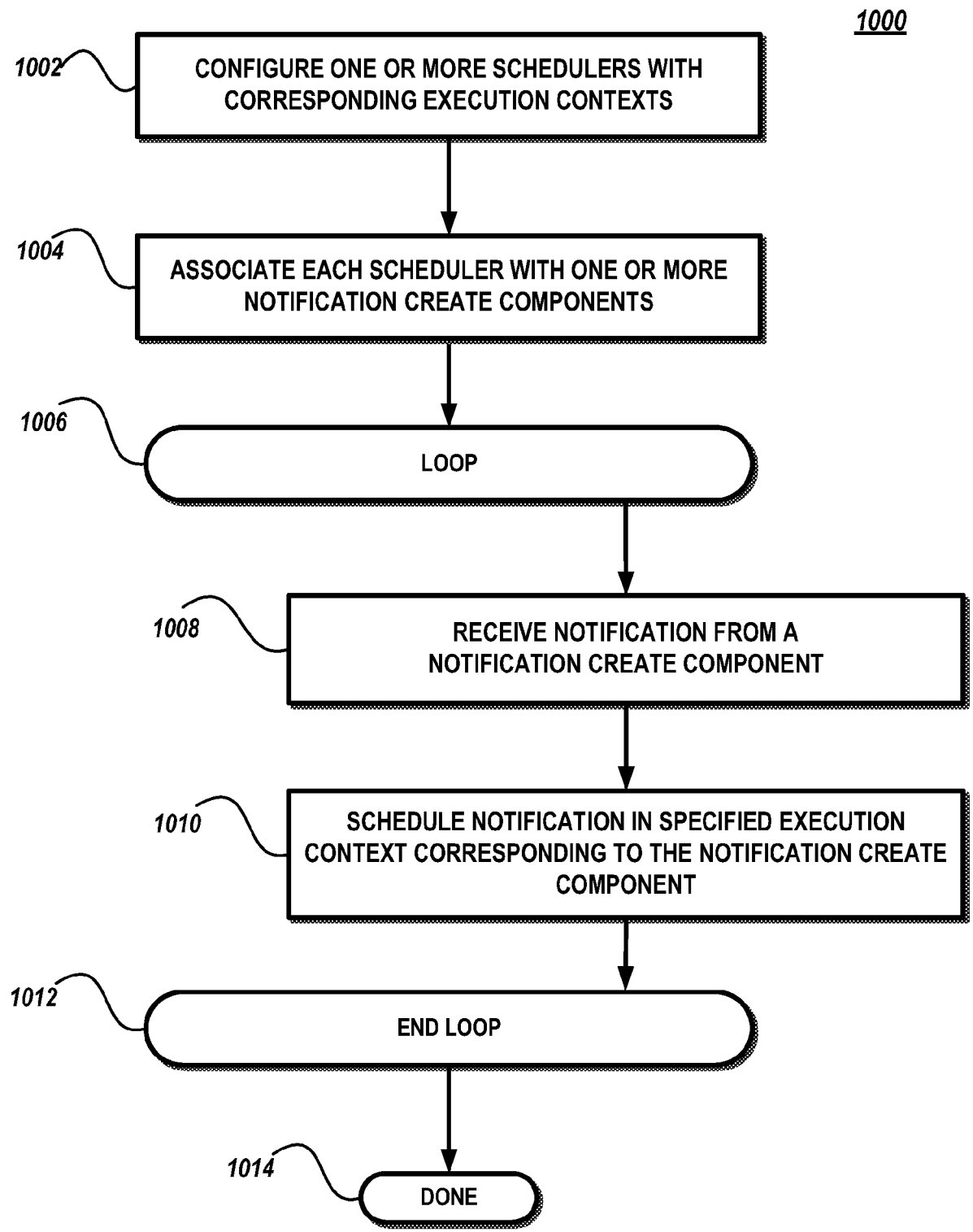
FIG. 10 is a flow diagram illustrating an example embodiment of a process for controlling execution context scheduling in a computer program by using execution context boxes.

FIG. 10 is a flow diagram illustrating an example embodiment of a process 1000 for controlling execution context scheduling in a computer program by using execution context boxes. In one embodiment, the actions of process 1000, or a portion thereof, are performed by computing system 200 of FIG. 2. Process 1000, or a portion thereof, may be used to implement a permissive policy or a hybrid policy, as described herein.

The illustrated portions of process 1000 may be initiated at block 1002, where each of one or more schedulers, such as schedulers 818 or 848 of FIG. 8, may be configured to a corresponding specified execution context. The process may flow to block 1004, where each scheduler may be associated with one or more notification create components of the computer program. The process may flow to loop 1006, which iterates over one or more received notifications produced by the notification create components. In the illustrated embodiment, loop 1006 includes boxes 1008-1012. At block 1008, a notification produced by one of the notification create components may be received. The process may flow to block 1010, where the received notification is scheduled to be processed in the specified execution context corresponding to the notification create component that produced it and the corresponding scheduler. The process may flow to block 1012, which terminates loop 1006. The process may flow back to loop 1006 to perform another iteration, or exit based on program logic. Upon exiting, the process may flow to done block 1014 and exit or return to a calling program.

Figure 11:
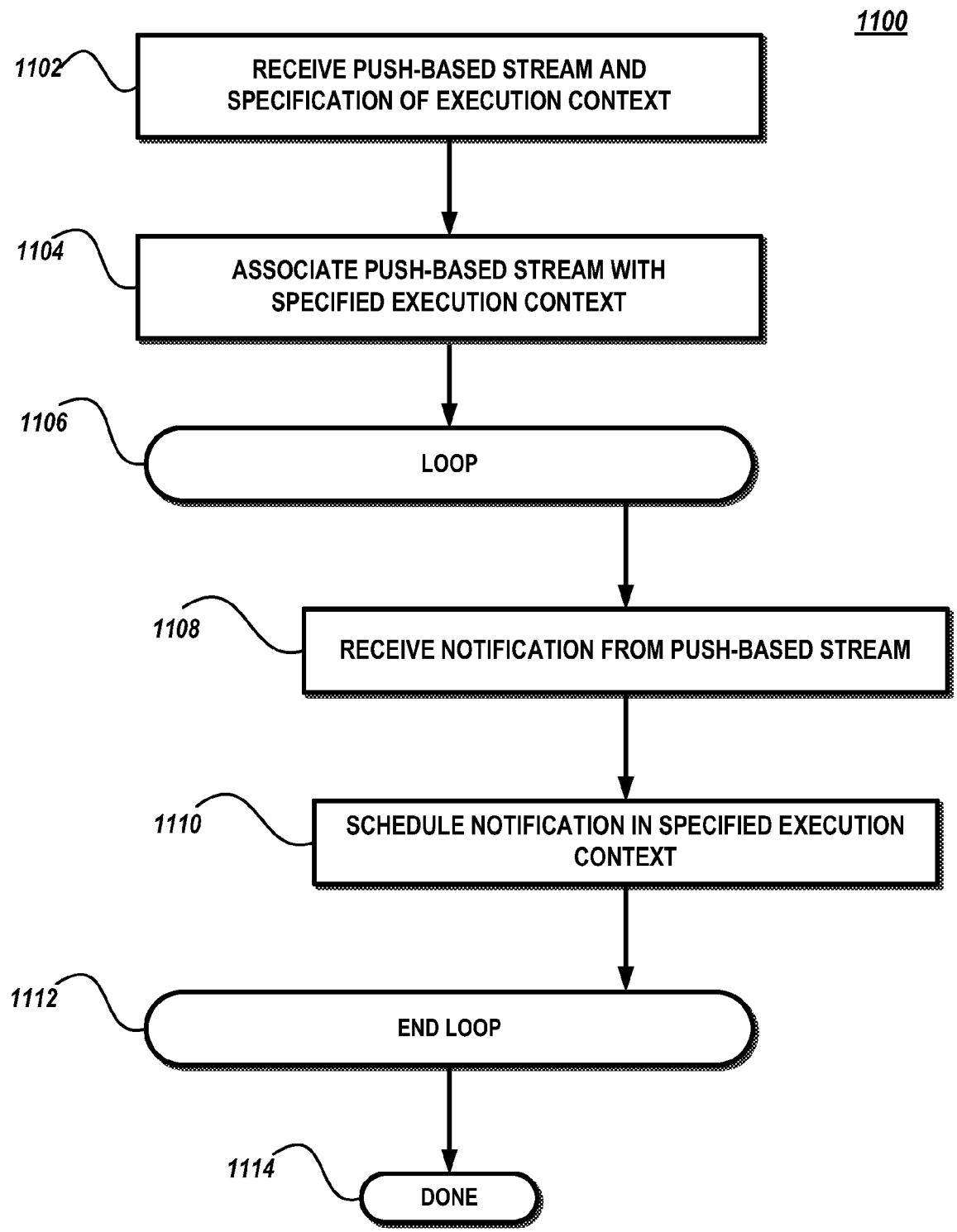
FIG. 11 is a flow diagram illustrating an example embodiment of a process for controlling execution context scheduling in a computer program.

FIG. 11 is a flow diagram illustrating an example embodiment of a process 1100 for controlling execution context scheduling in a computer program. In one embodiment, the actions of process 1100, or a portion thereof, are performed by RunOn component 220 of FIG. 2. Process 1100, or a portion thereof, may be used to implement a RunOn component, as described herein.

The illustrated portions of process 1100 may be initiated at block 1102, where a push-based stream and a specification of an execution context may be received. In some embodiments, the execution context specification may be preconfigured in a RunOn component. The process may flow to block 1104, where the received push-based stream may be associated with the specified execution context. The process may flow to loop 1106, which iterates over one or more notifications received in the push-based stream. In the illustrated embodiment, loop 1106 includes boxes 1108-1112. At block 1108, a notification from the received push-based stream may be received. The process may flow to block 1110, where the received notification is scheduled to be processed in the specified execution context. The process may flow to block 1112, which terminates loop 1106. The process may flow back to loop 1106 to perform another iteration, or exit based on program logic. Upon exiting, the process may flow to done block 1114 and exit or return to a calling program.

Figure 12:
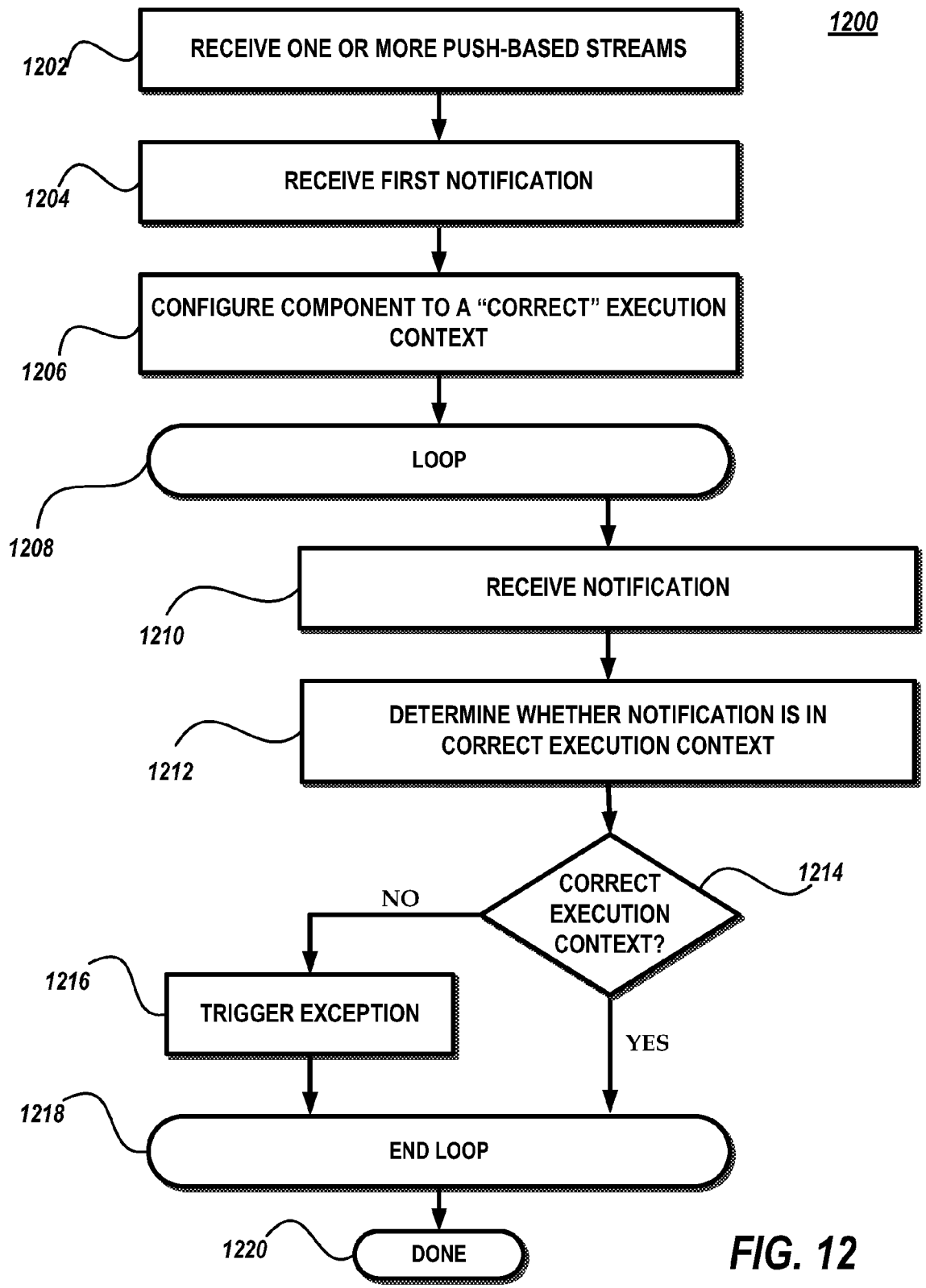
FIG. 12 is a flow diagram illustrating an example embodiment of a process for performing error checking of notification execution contexts in a computer program.

FIG. 12 is a flow diagram illustrating an example embodiment of a process 1200 for performing error checking of notification execution contexts in a computer program. In one embodiment, the actions of process 1200, or a portion thereof, are performed by error checker 224 of FIG. 2. Process 1200, or a portion thereof, may be used to implement a hybrid policy, as described herein. In the discussion that follows, references are made to FIG. 7, which provides an example of process 1200.

The illustrated portions of process 1200 may be initiated at block 1202, where one or more push-based streams may be received. For example, the push-based streams may be received by an operation component such as merge component 212. Push-based streams 702, 704, and 706, of FIG. 7, are examples of such push-based streams. The push-based stream may accompany a request to combine the push-based streams in some manner.

The process may flow to block 1204, where a first notification is received. Notification 712B illustrates such a notification. The process may flow to block 1206, where a component, such as error checker 224, may be configured to a "correct" execution context. In one embodiment, this may be the execution context of the first received notification. Configuring an error checker may be the result of the error checker or associated component beginning execution on the correct execution context as a result of receiving a notification in that execution context. In one embodiment, the correct execution context may be determined in another manner, such as a specification passed to the error checker component. For example, a specification may indicate that a UI thread is to be the correct execution context, regardless of the thread that the error checker may be executing on.

The process may flow to loop 1208, which iterates over one or more received notifications. In the illustrated embodiment, loop 1208 includes boxes 1210-1218.

At block 1210, a notification may be received. The process may flow to block 1212, where a determination is made of whether the received notification is in the correct execution context. The process may flow to decision block 1214, where a decision is made based on the determination of block 1212.

If, at decision block 1214, it is determined that the execution context of the received notification is equivalent to the correct execution context, the process may flow to block 1218, which terminates loop 1208. The process may flow back to loop 1208 to perform another loop iteration, or exit based on program logic. Upon exiting, the process may flow to done block 1220 and exit or return to a calling program.

If, at decision block 1214, it is determined that the execution context of the received notification is not equivalent to the correct execution context, the process may flow to block 1216, where an exception may be triggered, or an error notification may be provided in another manner. In some embodiments, an execution context error may cause loop 1208 to exit. In some embodiments, the process may flow from block 1216 to block 1218 and perform another loop iteration. For example, in one embodiment, an exception handler may perform actions to move the received notification to the correct execution context. In one embodiment, the error may be indicated in some manner, and the program may be allowed to continue.

The components described herein may be implemented in a variety of ways. In one implementation, RunOn component, or a portion thereof, is implemented as a function that receives a push-based stream, configures the push-based stream to be associated with an execution context, producing a new push-based stream that includes a modification of the notifications from the input push-based stream, the modification being the association with the execution context. Similarly, other components, such as merge component 212, select component 214, or where component 216, may receive one or more push-based streams as input, produce, and return a new push-based stream from the input push-based stream(s). This is referred to as a "fluent" API, in which each operation returns an object of the same type that it receives. This enables source language statements that string together multiple operations, each one receiving the output of the one that precedes it. The output push-based streams may also be assigned to variables in a source language program, as regular first class variables.

An implementation of a RunOn component may include, in response to an occurrence of a notification from the push-based stream, invoking a scheduler to cause the notification to be processed on the associated execution context. In one implementation, a scheduler is associated with an execution context such that an association with the scheduler indicates an association with the execution context. In one implementation, a scheduler may be associated with multiple execution contexts and an identification of the desired execution context is passed to the scheduler. In one embodiment, one or more RunOn functions may be each configured to employ a corresponding execution context, so that an execution context need not be specified in the invocation. For example, the methods RunOnUIThread( ) RunOnNotificationLoop( ), RunOnThreadPool( ),and RunOnNewThread( ) may be used to cause notifications to be processed on the UI thread, a synchronized notification loop, a system pool of threads, or a newly created thread, respectively. Other variations may correspond to a specific processor, device, or other execution context.

In one implementation, a scheduler may include a scheduler creation function that instantiates a scheduler object. The scheduler object may be lazily created. That is, it is not created until the first time that it is used to perform an action. As described above, a scheduler instance may be correspond to one execution context or may be associated execution contexts, the identification being passed during an invocation. An implementation of a scheduler may include logic that places a notification in the associated execution context. For an execution context that is a thread or pool of threads, an implementation may include placing the notification onto a queue associated with the thread or thread pool. For some execution contexts, a scheduler implementation may include posting the notification to the correct context.

Figure 13:
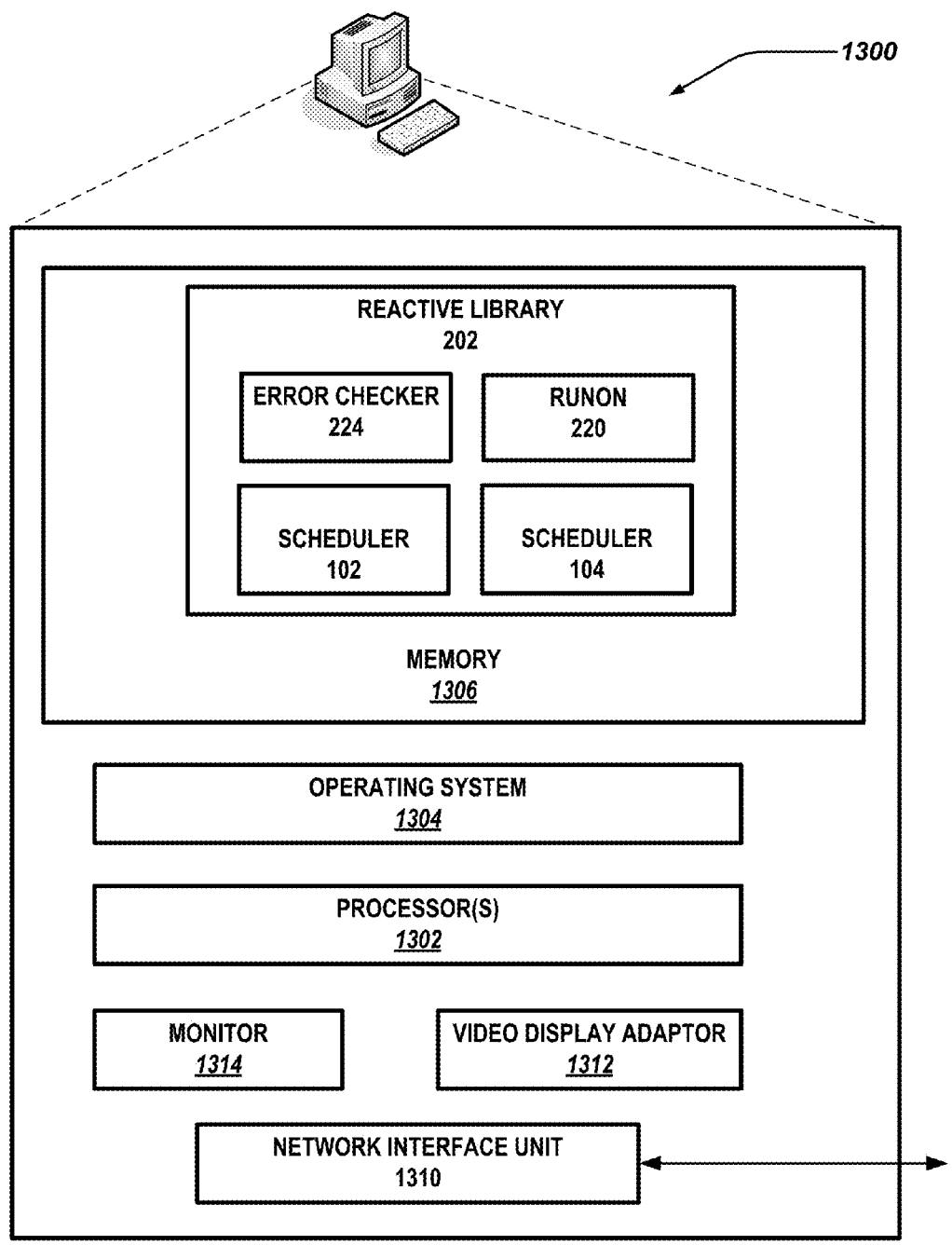
FIG. 13 is a block diagram of a computing device that may implement embodiments of the technologies described herein.

FIG. 13 shows one embodiment of a computing device 1300, illustrating selected components of a computing device that may be used to perform functions described herein and attributed to computing system 100 or computing system 200. Computing device 1300 may include many more components than those shown, or may include less than all of those illustrated.

As illustrated, computing device 1300 includes one or more processors 1302, which perform actions to execute instructions of various computer programs. In one configuration, each processor 1302 may include one or more central processing units, one or more processor cores, one or more ASICs, cache memory, or other hardware processing components and related program logic. As illustrated, computing device 1300 includes an operating system 1304. Operating system 1304 may be a general purpose or special purpose operating system. The Windows® family of operating systems, by Microsoft Corporation, of Redmond, Wash., are examples of operating systems that may execute on computing device 1300. Computing device 1300 may provide multiple software or hardware threads, multiple processes, or multiple operating systems. The components of computing device may be combined or partitioned in a variety of configurations.

Memory 1306 may include one or more of a variety of types of non-transitory computer storage media, including volatile or non-volatile memory, RAM, ROM, solid-state memory, disk drives, optical storage, or any other medium that can be used to store digital information. In one configuration, memory 1306 may store reactive library 202, including one or more of schedulers 102 and 104, error checker 224, RunOn component 220, or various combinations thereof. In some configurations, any one or more of these components, or a portion thereof, may be implemented in hardware, software, or a combination thereof.

Computing device 1300 may include a video display adapter 1312 that facilitates display of localized text strings to a user, or a speech component (not shown) that converts text to audio speech and presents the spoken strings to a user. Though not illustrated in FIG. 13, computing device 1300 may include a basic input/output system (BIOS), and associated components. Computing device 1300 may also include a network interface unit 1310 for communicating with a network. Embodiments of computing device 1300 may include one or more of a display monitor 1314, keyboard, pointing device, audio component, microphone, voice recognition component, or other input/output mechanisms.

It will be understood that each block of the flowchart illustration of FIGS. 9-12, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of controlling a handling of notifications of push-based streams in a computer program executing in a system having a plurality of execution contexts, the method comprising:
   a) receiving a request to process notifications of a first push-based stream in a first execution context, the notifications originating in a second execution context different from the first execution context;
   b) in response to receiving the request, associating the first push-based stream with the second execution context and producing a second push-based stream that represents the association of the first push-based stream with the second execution context;
   c) returning the second push-based stream; and
   d) in response to an occurrence of a notification of the second push-based stream, processing the notification of the second push-based stream in the first execution context.

2. The computer-based method of claim 1, the method further comprising providing a source language interface that receives the request to process the push notification, returns the second push-based stream, and receives another request to modify the second push-based stream.

3. The computer-based method of claim 1, the method further comprising:
   a) receiving a request to associate one or more notification creation components with a third execution context, the third execution context different from the first execution context;
   b) in response to receiving the request to associate, configuring the system to associate notifications produced by the one or more notification creation components with the third execution context; and
   c) in response to an occurrence of a notification of the notifications produced by the one or more notification creation components, causing a scheduler to schedule the notification in the third execution context.

4. The computer-based method of claim 1, the method further comprising:
   a) receiving a first request to associate a first group of notification creation components with a third execution context;
   b) in response to receiving the request to associate, configuring the system to associate notifications produced by the first group of notification creation components with the third execution context;
   c) receiving a second request to associate a second group of notification creation components with a fourth execution context, the fourth execution context different from the third execution context;
   d) in response to receiving the second request to associate, configuring the system to associate notifications produced by the second group of notification creation components with the fourth execution context;
   e) in response to an occurrence of a notification of the notifications produced by the first group of notification creation components, causing a first scheduler to schedule the notification in the third execution context; and
   f) in response to an occurrence of a notification of the notifications produced by the second group of notification creation components, causing a second scheduler to schedule the notification in the fourth execution context.

5. The computer-based method of claim 1, further comprising, in response to a request to combine a first notification with a second notification into a combined push-based stream, determining whether the execution context associated with the first notification is equivalent to an execution context associated with the second notification and selectively providing an error notification based on the determination.

6. The computer-based method of claim 1, the first execution context and the second execution context are threads.

7. The computer-based method of claim 1, the second execution context is a user interface thread.

8. The computer-based method of claim 1, the second execution context is a synchronized event loop, a system pool of threads, or a newly created thread.

9. A computer-based system for facilitating execution of a computer program, the computer program controlling one or more processors to perform actions including creating notifications in a plurality of execution contexts, the system comprising:
   a) an execution context hopping component configured to perform actions including receiving a first push-based stream associated with a first execution context of the plurality of execution contexts, transforming the first push-based stream into a second push-based stream associated with a second execution context of the plurality of execution contexts;
   b) a set of operators that receive a plurality of notifications and perform actions on the notifications;
   c) an error checker component that determines whether the plurality of notifications are associated with a common execution context and selectively provides an error notification based on the determination; and
   d) an interface to the execution context hopping component and the set of operators that facilitates separating the associating of the second execution context from a subsequent handling of the plurality of notifications.

10. The computer-based system of claim 9, further comprising context association means for associating a first plurality of notification creator components with an execution context and producing a first corresponding push-based stream, and associating a second plurality of notification creator components with a different execution context, producing a second corresponding push-based stream.

11. The computer-based system of claim 9, further comprising a global scheduler that associates all notification creator components with a common execution context.

12. The computer-based system of claim 9, the error checker determination comprising:
   a) receiving a notification; and
   b) prior to handling of the notification by an associated notification handler, determining whether the notification is in an execution context associated with a previous notification.

13. A hardware computer-readable storage medium comprising computer program instructions for controlling a handling of notifications in a target computer program executing in a computer system having a plurality of execution contexts, the program instructions executable by a processor to perform actions including:
   a) receiving a first push-based stream associated with a first execution context of the plurality of execution contexts;
   b) transforming the first push-based stream by associating the first push-based stream with a second execution context of the plurality of execution contexts prior to a receipt of a set of notifications originating in the first execution context;
   c) producing a second push-based stream from the transformed push-based stream;
   d) enabling the second push-based stream to be assigned to a target program first class variable; and e) enabling a notification handler to process the set of notifications in the second execution context.

14. The computer-readable storage medium of claim 13, the actions further including:
a) receiving a first notification of the set of notifications;
b) receiving a second notification in a third push-based stream;
c) determining whether the second notification is associated with the second push-based stream;
d) selectively providing an error notification based on the determination.

15. The computer-readable storage medium of claim 13, the second execution context is a user interface thread, the first execution context is a different thread.

16. The computer-readable storage medium of claim 13, further comprising adding notifications from the second push-based stream onto a queue associated with the second notification context.

17. The computer-readable storage medium of claim 13, the actions further including:
a) receiving a request to combine a third push-based stream and a fourth push-based stream into a fifth push-based stream;
c) receiving a notification in the fifth push-based stream, the notification having an associated execution context;
b) selectively providing an error notification based on the execution context associated with the notification, prior to processing of the notification by a notification handler associated with the notification.

18. The computer-readable storage medium of claim 13, the program instructions providing a function that receives a specification of the first push-based stream and a specification of the first execution context, and returns the second push-based stream.

19. The computer-readable storage medium of claim 13, each of the first execution context and the second execution context having a corresponding hardware processor different from the other.

20. The computer-readable storage medium of claim 13, the actions further comprising providing a mechanism to configure all push-based streams of the target computer program to be processed in a single designated execution context.

* * * * *